(12) United States Patent
Mastroianni

(10) Patent No.: US 8,046,921 B2
(45) Date of Patent: Nov. 1, 2011

(54) APPARATUS FOR CORING AND WEDGING FOOD ITEMS

(75) Inventor: Michael R. Mastroianni, Crystal Lake, IL (US)

(73) Assignee: Focus Products Group, LLC, Vernon Hills, IL (US)

( * ) Notice: Subject to any disclaimer, the term of this patent is extended or adjusted under 35 U.S.C. 154(b) by 399 days.

(21) Appl. No.: 12/057,487

(22) Filed: Mar. 28, 2008

(65) Prior Publication Data

US 2009/0241344 A1   Oct. 1, 2009

(51) Int. Cl.
*A23N 4/12* (2006.01)

(52) U.S. Cl. ............ 30/114; 30/113.2; 30/174; 30/302; 99/537

(58) Field of Classification Search ............ 30/113, 30/1, 113.3, 114, 173, 174, 177, 186, 279.2, 30/302, 315; D7/673, 674; 99/537, 541–545, 99/549, 558, 561, 565–566; 403/97, 98, 403/101, 102, 326, 328, 330, 348–353, 375; 83/402, 403, 408, 581.1, 599, 629, 651.1, 83/857, 932

See application file for complete search history.

(56) References Cited

U.S. PATENT DOCUMENTS

| | | |
|---|---|---|
| 293,542 A | 2/1884 | Victor |
| 703,331 A | 6/1902 | Acree |
| 951,241 A | 3/1910 | Hampel |
| 1,466,114 A | 8/1923 | Buchi |
| 1,581,310 A | 4/1926 | Fetschan |
| 1,744,422 A * | 1/1930 | Taylor ............................ 30/302 |
| 1,864,147 A | 6/1932 | Rantine |
| D114,471 S | 4/1939 | Rosenbeg |
| 2,397,496 A | 4/1946 | Lunt |
| D158,619 S | 5/1950 | Shadduck |
| 2,560,229 A | 7/1951 | Leavens |
| 2,625,972 A | 1/1953 | Torres |
| 2,647,549 A | 8/1953 | Koch |
| 2,735,467 A | 2/1956 | Hellmich |
| 2,824,588 A | 2/1958 | Lyon et al. |
| 2,836,212 A | 5/1958 | Shaw |
| 2,971,549 A | 2/1961 | Langville |
| 3,060,838 A | 10/1962 | Priore |
| 3,112,781 A | 12/1963 | Popeil |
| 3,128,810 A | 4/1964 | Whipp |
| 3,216,474 A * | 11/1965 | Popeil ............................ 83/662 |
| 3,468,355 A | 9/1969 | Hall |
| 3,810,308 A | 5/1974 | Stubbmann |
| 3,830,151 A | 8/1974 | Gerson |
| 4,062,260 A | 12/1977 | Steinhogl |
| 4,095,339 A | 6/1978 | Turner |
| 4,095,518 A | 6/1978 | Jones |

(Continued)

FOREIGN PATENT DOCUMENTS

GB   2286110   8/1995

(Continued)

*Primary Examiner* — Edward Landrum
(74) *Attorney, Agent, or Firm* — Michael Best & Friedrich LLP

(57) ABSTRACT

A food cutting apparatus includes a body defining a first opening and supporting a first blade extending within the first opening. The first blade is configured to cut the food item. The apparatus also includes a dial rotatably coupled to the body about an axis and defining a second opening substantially aligned with the first opening. The dial supports a second blade extending within the second opening. The second blade is configured to cut the food item.

20 Claims, 7 Drawing Sheets

U.S. PATENT DOCUMENTS

| | | | |
|---|---|---|---|
| 4,165,855 A | 8/1979 | Mason, Jr. | |
| 4,436,025 A | 3/1984 | Jones | |
| 4,497,245 A | 2/1985 | Mori | |
| D280,690 S | 9/1985 | Bloxham | |
| 4,545,297 A | 10/1985 | Ihlow | |
| 4,569,280 A | 2/1986 | D'Ambro et al. | |
| 4,580,343 A | 4/1986 | Bell, Jr. | |
| 4,690,047 A | 9/1987 | Balzano | |
| 4,959,903 A | 10/1990 | Daoust et al. | |
| 4,998,348 A | 3/1991 | Foate | |
| 5,009,141 A | 4/1991 | Julian et al. | |
| 5,035,056 A | 7/1991 | Sheffield | |
| 5,074,777 A | 12/1991 | Garner | |
| 5,142,973 A | 9/1992 | Tur et al. | |
| 5,337,480 A | 8/1994 | Codikow | |
| 5,363,756 A | 11/1994 | Muro | |
| 5,373,781 A | 12/1994 | Knasel | |
| 5,375,512 A | 12/1994 | Ertmer | |
| 5,421,249 A | 6/1995 | Repisky et al. | |
| 5,431,078 A | 7/1995 | Ricard et al. | |
| 5,446,965 A | 9/1995 | Makridis | |
| 5,463,943 A | 11/1995 | Knasel | |
| 5,533,442 A * | 7/1996 | Tateno | 99/541 |
| 5,626,067 A | 5/1997 | Lothe | |
| D379,907 S | 6/1997 | Israeli | |
| 5,692,424 A | 12/1997 | Wallace | |
| D401,813 S | 12/1998 | Johnson et al. | |
| 5,937,525 A | 8/1999 | Chan | |
| 5,947,016 A | 9/1999 | Repac et al. | |
| D415,937 S | 11/1999 | Robinson | |
| D432,874 S | 10/2000 | Kari | |
| 6,371,014 B1 | 4/2002 | Ismail et al. | |
| 6,382,089 B1 | 5/2002 | Thiffault | |
| D464,853 S | 10/2002 | Klamer | |
| 6,474,747 B2 * | 11/2002 | Beaulieu et al. | 30/296.1 |
| D473,109 S | 4/2003 | Birchansky | |
| 6,557,260 B1 | 5/2003 | Morris | |
| 6,805,032 B2 | 10/2004 | Engdahl | |
| D499,615 S | 12/2004 | Nordgren | |
| D501,371 S | 2/2005 | Lo | |
| D508,383 S | 8/2005 | Endres et al. | |
| D521,819 S | 5/2006 | So et al. | |
| 7,073,260 B2 | 7/2006 | Jensen | |
| 7,086,155 B2 | 8/2006 | Chan et al. | |
| D535,164 S * | 1/2007 | St. Germain et al. | D7/674 |
| D547,620 S | 7/2007 | Walzak et al. | |
| 7,258,053 B2 | 8/2007 | Suer et al. | |
| D550,521 S | 9/2007 | Roberson et al. | |
| 7,266,894 B1 | 9/2007 | Hinckley | |
| 7,290,342 B2 * | 11/2007 | Hartmann et al. | 30/376 |
| 7,836,822 B2 | 11/2010 | Cheng | |
| 2004/0117989 A1 * | 6/2004 | Horng | 30/114 |
| 2005/0150117 A1 | 7/2005 | Walzak et al. | |
| 2005/0229405 A1 | 10/2005 | Endres et al. | |
| 2006/0117966 A1 | 6/2006 | Chang | |
| 2006/0254058 A1 * | 11/2006 | Chang | 30/114 |
| 2009/0249965 A1 * | 10/2009 | Hauser | 99/552 |
| 2009/0282990 A1 | 11/2009 | Farnum et al. | |

FOREIGN PATENT DOCUMENTS

| | | |
|---|---|---|
| WO | 2005090029 | 9/2005 |

* cited by examiner

APPARATUS FOR CORING AND WEDGING FOOD ITEMS

BACKGROUND

The present invention relates to an apparatus for cutting food items and, more particularly, to an apparatus for coring and wedging food items such as fruits and vegetables.

Cutting utensils, such as knives, are commonly used to cut or slice food items (e.g., fruits, vegetables, etc.). Other specialized cutting utensils have also been employed to perform more specific functions, such as, for example, coring or peeling food items. More recently, apple wedges have been used to simultaneously core and slice, or wedge, apples or other food items into multiple pieces, or wedges. These wedges typically include fixed blades such that the apples are always cut into the same number of wedges.

SUMMARY

In one embodiment, a food cutting apparatus includes a body defining a first opening and supporting a first blade extending within the first opening. The first blade is configured to cut the food item. The apparatus also includes a dial rotatably coupled to the body about an axis and defining a second opening substantially aligned with the first opening. The dial supports a second blade extending within the second opening. The second blade is configured to cut the food item.

In another embodiment, the food cutting apparatus includes a handle, a first plurality of blades fixedly attached to the handle, and a second plurality of blades coupled to the handle and rotatable relative to the first plurality of blades between a first position to cut the food item into a first number of pieces and a second position to cut the food item into a second number of pieces. The second number of pieces is greater than the first number of pieces Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

FIGS. 1 to 4 illustrate a cutting apparatus 10 according to an embodiment of the invention. In the illustrated embodiment, the cutting apparatus 10 is a corer/wedge operable to core and wedge food items, such as, for example, fruits and vegetables. The cutting apparatus 10 simultaneously cuts out a central portion, or core, of a food item and slices the remainder of the food item into a plurality of pieces or wedges. The illustrated cutting apparatus 10 can cut food items into eight or sixteen wedges, although in other embodiments the cutting apparatus 10 can be configured to cut the food times into fewer or more wedges.

Figure 1:
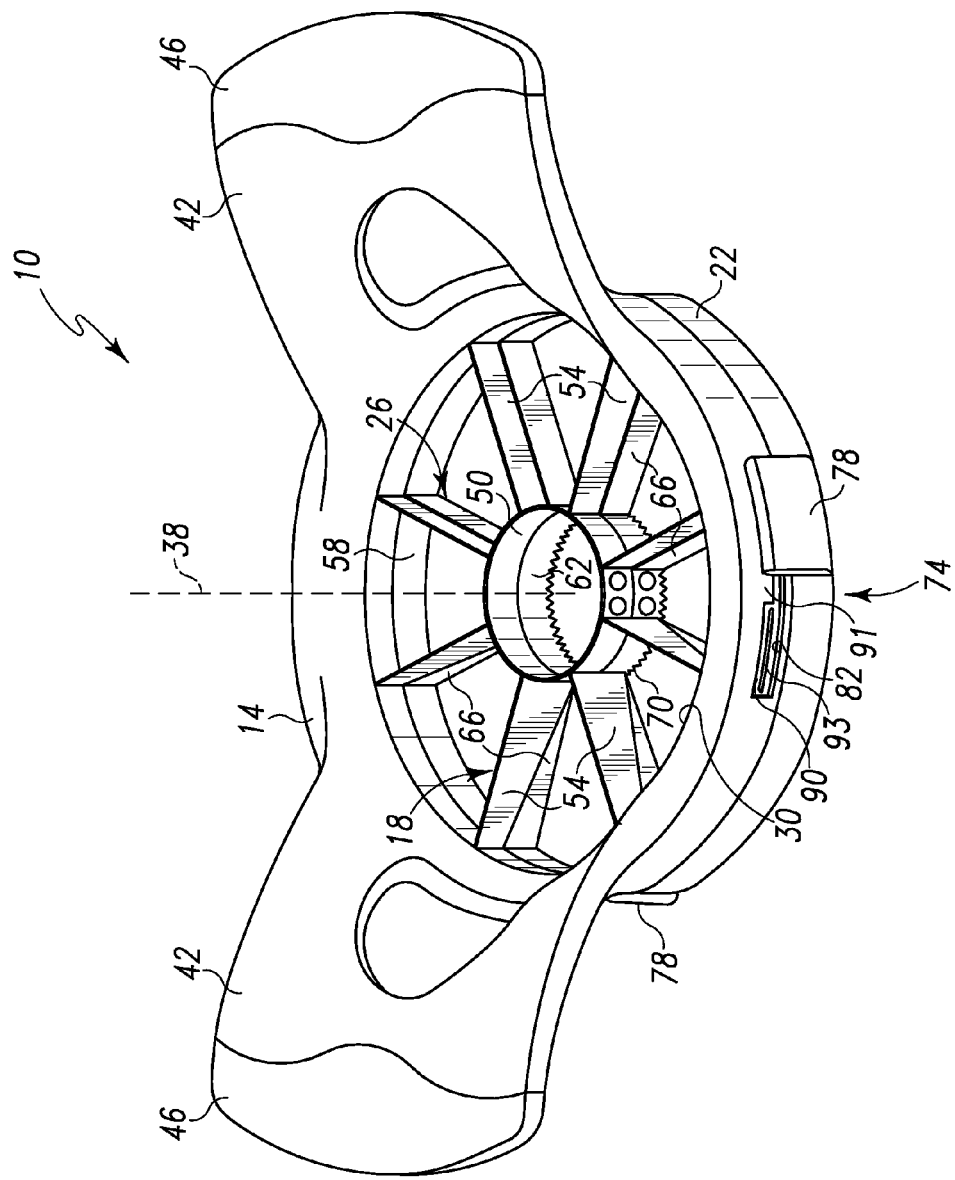
FIG. 1 is a top perspective view of an embodiment of a cutting apparatus, the cutting apparatus including a dial in a first position.

As shown in FIG. 1, the cutting apparatus 10 includes a body 14, a first blade assembly 18 supported by the body 14, a dial 22 rotatably coupled to the body 14, and a second blade assembly 26 supported by the dial 22. In the illustrated embodiment, the body 14 and the dial 22 are composed of a hard plastic material such that the cutting apparatus 10 is durable and may be easily cleaned and/or disinfected. In other embodiments, the body 14 and the dial 22 may be composed of different materials, such as, for example, stainless steel, wood, or the like.

Figure 3:
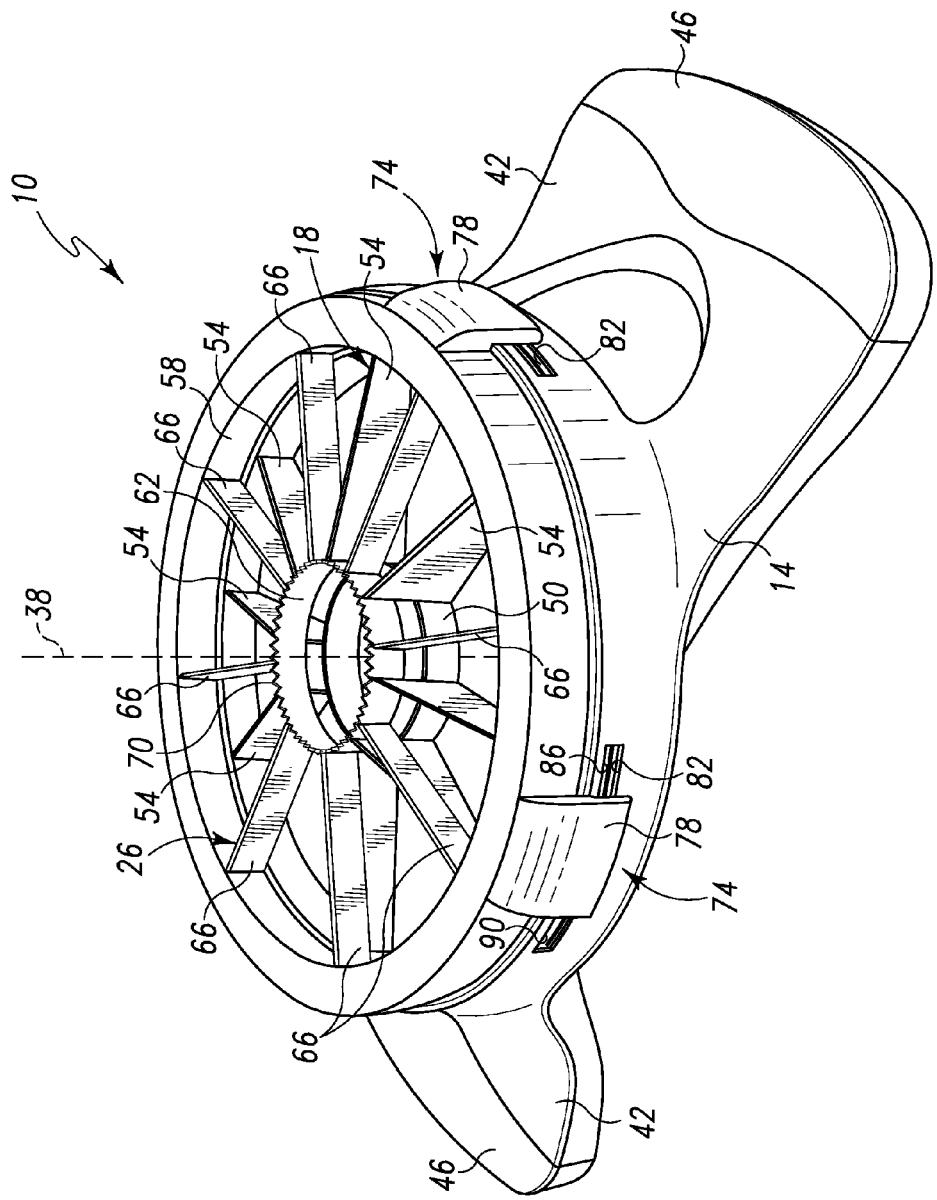
FIG. 3 is a side perspective view of the cutting apparatus of FIG. 1.
Figure 4:
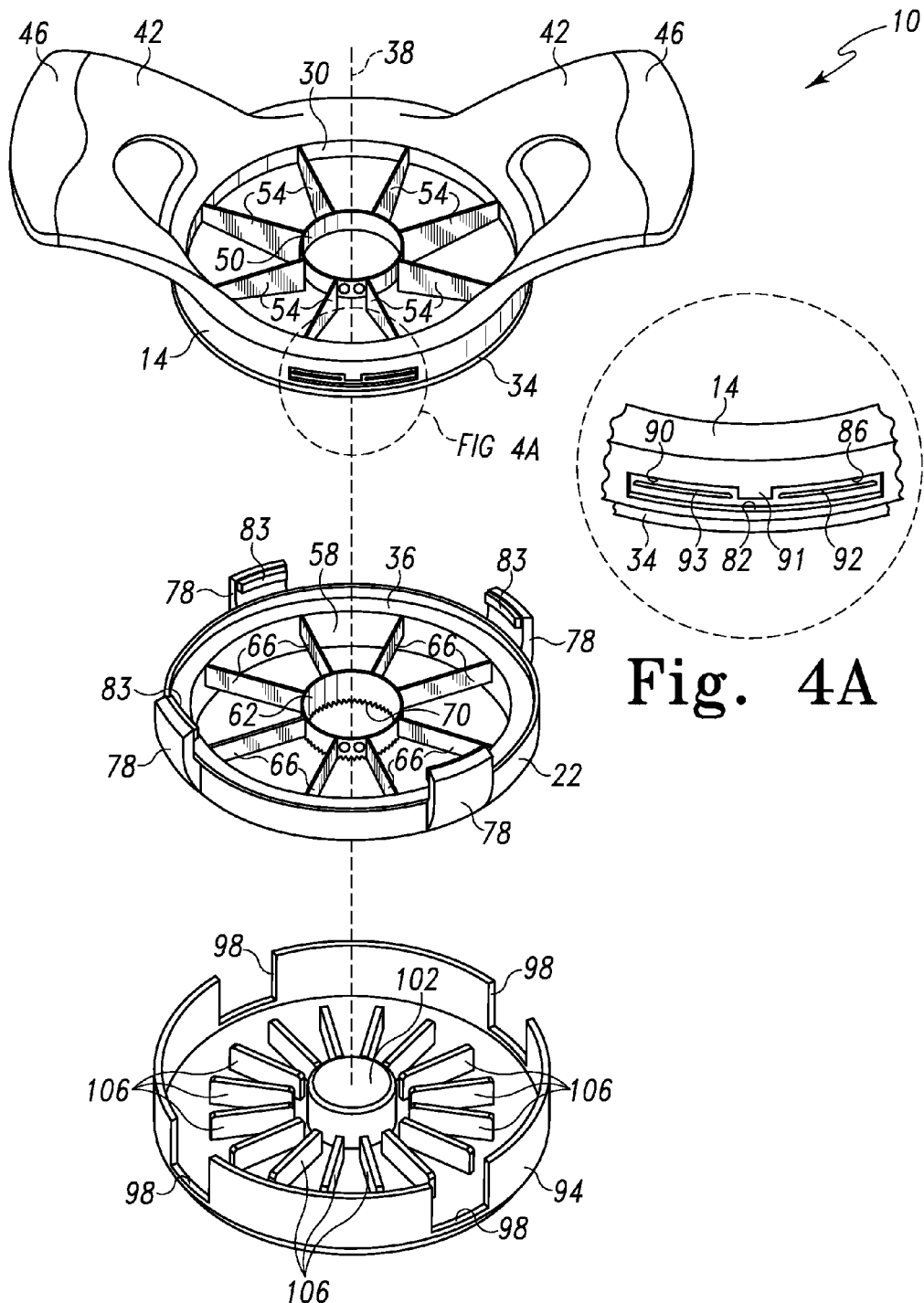
FIG. 4 is an exploded perspective view of the cutting apparatus of FIG. 1.

Referring to FIGS. 1 and 4, the body 14 defines a first opening 30 and includes an annular lip 34 surrounding the first opening 30. The illustrated first opening 30 is a generally circular opening having an axis 38 extending generally through a center thereof. In other embodiments, the first opening 30 may be, for example, rectangular, hexagonal, oblong, irregular, or the like. As shown in FIGS. 3 and 4, the annular lip 34 is formed on the body 14 adjacent to the first opening 30 and extends downwardly when the cutting apparatus 10 is in use. When the dial 22 is coupled to the body 14, the lip 34 fits within a track 36 (FIG. 4) defined by the dial 22. When the dial 22 is at least partially separated from the body 14 (as shown in FIG. 3), the lip 34 is spaced apart from the track 36 such that the dial 22 may rotate relative to the body 14 without rubbing against the lip 34. As further discussed below, tabs 78 coupled to the dial 22 and slots 82 formed in the body 14 inhibit complete separation of the dial 22 from the body 14.

Figure 2:
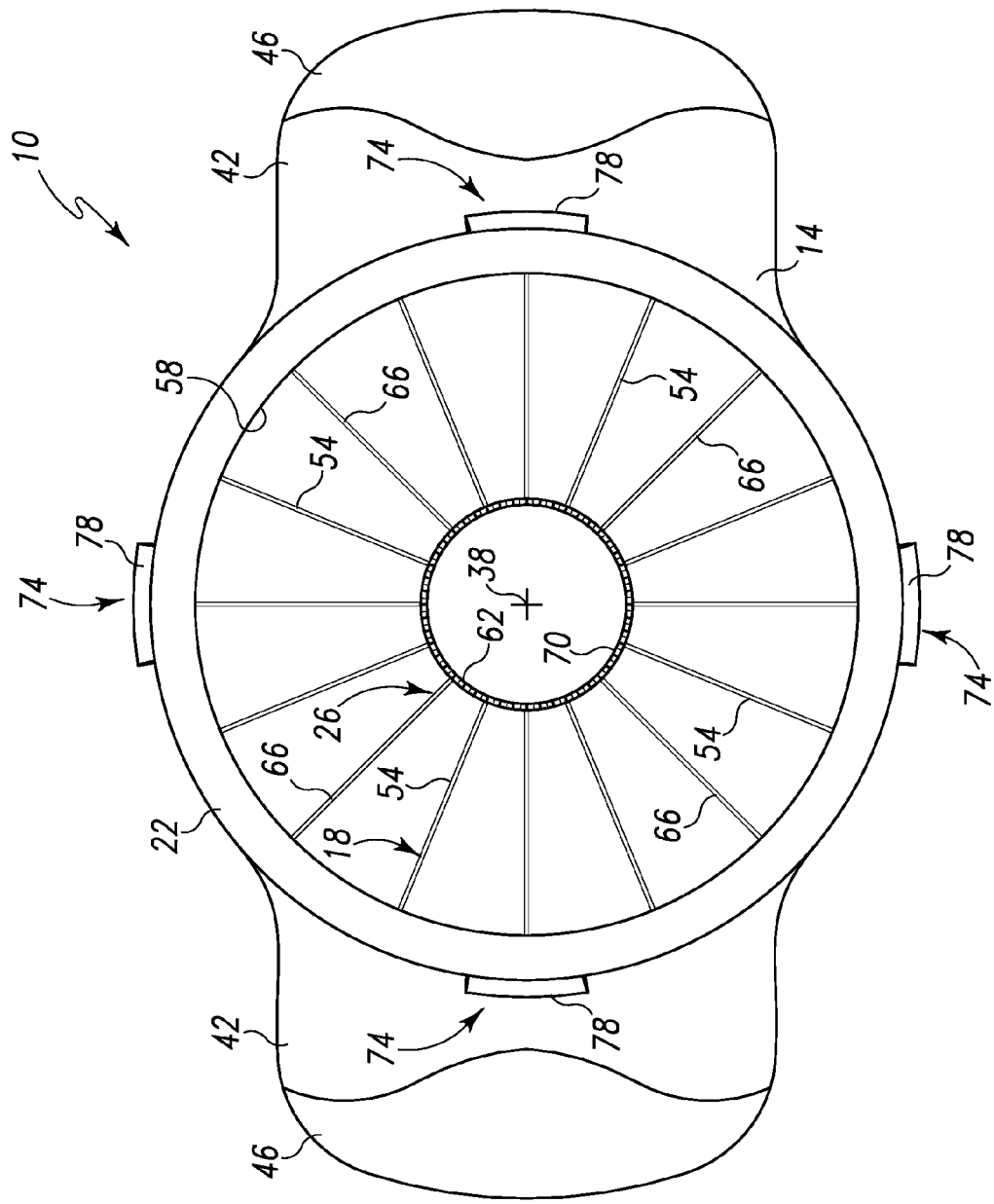
FIG. 2 is a bottom plan view of the cutting apparatus of FIG. 1 with the dial in a second position.

As shown in FIGS. 1 to 4, the body 14 also includes two handles 42 extending outwardly from the first opening 30 (e.g., away from the axis 38). In the illustrated embodiment, the handles 42 are formed as a single piece with the body 14. In other embodiments, the handles 42 may be separate components that are coupled to the body 14 via fasteners, adhesives, welding, or the like. The handles 42 facilitate gripping and handling of the cutting apparatus 10 during operation. A portion of each handle 42 is covered with an elastomeric material 46 to improve the grip during operation. In addition, as shown in FIGS. 2 and 3, the handles 42 provide a base to support the cutting apparatus 10 on a support surface (e.g., a countertop, shelf, etc.) when not in use so that neither the cutting blades 66 nor the central ring 62 rests on the support surface to avoid scratching the support surface. The elastomeric material 46 also resists shifting or sliding of the cutting apparatus 10 along the support surface when not in use, thereby reducing the possibility of scratching or otherwise damaging the surface.

The illustrated first blade assembly 18 is positioned substantially within the first opening 30 and includes a central ring 50 and eight blades 54 substantially evenly spaced about the central ring 50. The bottom edge of each blade 54 is a sharp cutting edge configured to slice or cut a food item. The central ring 50 surrounds the axis 38, and the blades 54 extend radially from the central ring 50 to the body 14. In other embodiments, the first blade assembly 18 may include fewer or more blades 54 than the number illustrated and/or the blades 54 may not be evenly spaced about the central ring 50. As shown in FIGS. 1 to 4, the blades 54 are coupled to the central ring 50 at one end by welding or brazing and are molded into the body 14 at the other end. In other embodiments, the blades 54 may be coupled to the central ring 50 and the body 14 using other coupling means, such as, for example, fasteners (e.g., rivets) or adhesives.

In the illustrated embodiment, the height of the blades 54 taper from the central ring 50 to the body 14 such that portions of the blades 54 proximate the central ring 50 are substantially taller than portions of the blades 54 proximate the body 14. Accordingly, the portions of the blades 54 proximate the central ring 50 partially overlap portions of the second blade assembly 26 when the two blade assemblies 18, 26 are positioned next to or immediately adjacent to each other, as further discussed below.

In the illustrated embodiment, the dial 22 defines a second opening 58 that is substantially aligned with the first opening 30 of the body 14. The second opening 58 is a generally circular opening of approximately the same size as the first opening 30 such that the axis 38 also extends generally through a center of the second opening 58. As the dial 22 rotates about the axis 38, the second opening 58 remains aligned with the first opening 30, regardless of the position of the dial 22 relative to the body 14. In other embodiments, the second opening 58 may be, for example, rectangular, hexagonal, oblong, irregular, or the like to correspond to the shape of the first opening 30, or may be a different shape than the first opening 30 entirely.

The second blade assembly 26 is positioned substantially within the second opening 58 and includes a central ring 62 and eight blades 66 substantially evenly spaced about the central ring 62. The bottom edge of each blade 66 is a sharp cutting edge configured to slice or cut a food item. The central ring 62 surrounds the axis 38, and the blades 66 extend radially from the central ring 62 to the dial 22. In other embodiments, the second blade assembly 26 may include fewer or more blades 66 than the number illustrated and/or the blades 66 may not be evenly spaced about the central ring 62. Similar to the first blade assembly 18, the blades 66 of the second blade assembly 26 are coupled to the central ring 62 at one end by welding or brazing and are molded into the dial 22 at the other end. In other embodiments, the blades 66 may be coupled to the central ring 62 and the dial 22 by other coupling means. In the illustrated embodiment, the central ring 62 of the second blade assembly 26 includes a serrated cutting edge 70 and the blades 66 are substantially the same height along their entire length.

As mentioned above and shown in FIGS. 1 and 3, portions of the blades 54 (i.e., overlapping portions) of the first blade assembly 18 are at substantially the same height as the central ring 62 and the blades 66 of the second blade assembly 26. Accordingly, when the central ring 62 and the blades 66 of the second blade assembly 26 begin cutting a food item, the overlapping portions of the blades 54 begin cutting the food item at the same time as the central ring 62 and the blades 66, regardless of whether the cutting apparatus 10 is configured to cut the food item into eight or sixteen wedges. The overlapping portions of the blades 54 also help limit the rotation range of the dial 22 when the dial 22 is rotated relative to the body 14. In some embodiments, such as the embodiment shown in FIG. 7 and discussed below, the blades 154 of the first blade assembly 118 may be at substantially the same height as the blades 166 of the second blade assembly 126 across substantially the entire length of the blades 154, 166.

Figure 5:
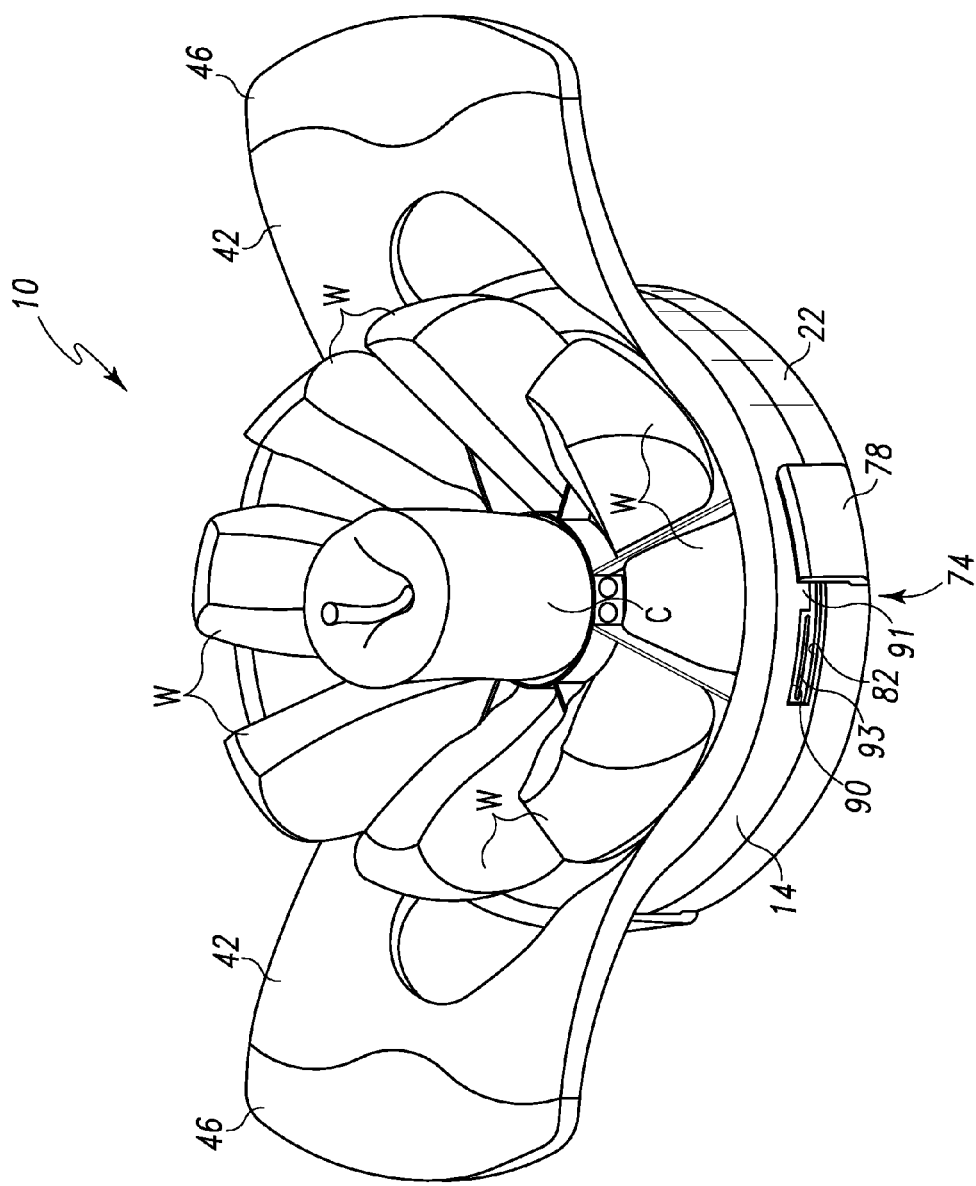
FIG. 5 is a perspective view of the cutting apparatus cutting an apple into eight wedges.

In the illustrated embodiment, the dial 22 rotates relative to the body 14 between a first, or aligned, position (FIG. 1) and a second, or offset, position (FIG. 2). In the first position, the first blade assembly 18 and the second blade assembly 26 are directly side-by-side or adjacent to each other. Each pair of corresponding blades 54, 66 thereby acts as a single blade to slice a food item. Referring to FIG. 5, the dial 22 is in the first position such that the cutting apparatus 10 cuts out a core C of a food item (e.g., an apple) and slices the remainder of the food item into eight wedges W of approximately the same size. In embodiments where the first and second blade assemblies 18, 26 include fewer or more blades 54, 66 (e.g., six or ten blades each), the cutting apparatus 10 will cut the food item into fewer or more wedges W (e.g., six or ten wedges).

Figure 6:
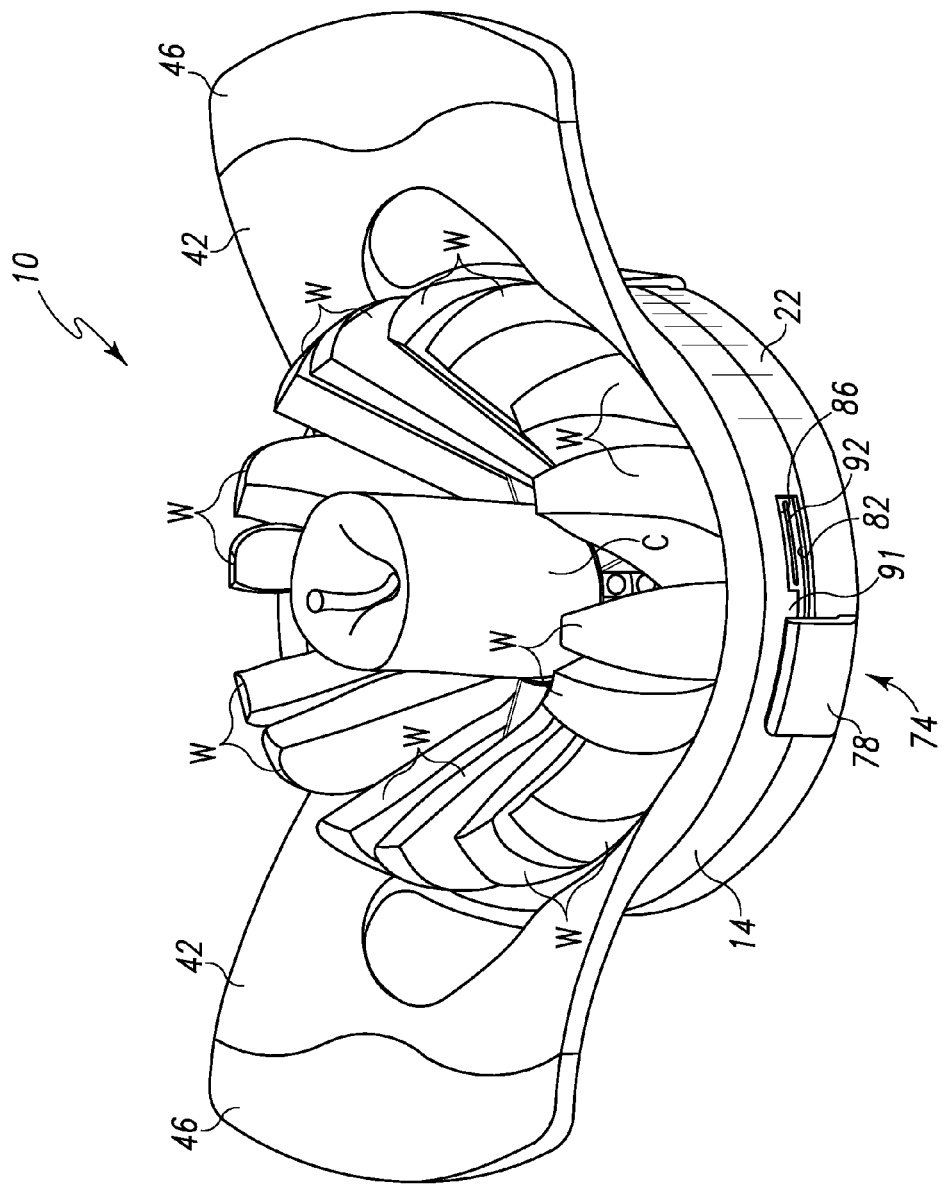
FIG. 6 is a perspective view of the cutting apparatus cutting an apple into sixteen wedges.

In the second position, the blades 66 of the second blade assembly 26 are offset (i.e., spaced apart) from the blades 54 of the first blade assembly 18 such that each blade 54, 66 makes its own cut in a food item. As shown in FIG. 2, the dial 22 rotates relative to the body 14 until the blades 66 of the second blade assembly 26 are approximately halfway between two successive blades 54 of the first blade assembly 18. In such a construction, the number of wedges created by the cutting apparatus 10 is doubled. For example, referring to FIG. 6, the dial 22 is in the second position such that the cutting apparatus 10 cuts out a core C of a food item (e.g., an apple) and slices the remainder of the food item into sixteen wedges W of approximately the same size. In embodiments where the first and second blade assemblies 18, 26 include fewer or more blades 54, 66 (e.g., six or ten blades each), the cutting apparatus 10 will cut the food item into fewer or more wedges W (e.g., twelve or twenty wedges).

In some embodiments, the dial 22 may be rotated relative to the body 14 into more positions than the number illustrated. For example, in one embodiment, the dial 22 may be rotated to a third position approximately halfway between the first position and the second position. In this position, the first blade assembly 18 and the second blade assembly 26 would cut a food item into eight substantially larger (e.g., thicker) wedges and eight substantially smaller (e.g., thinner) wedges.

In some embodiments, the first blade assembly 18 may be configured such that the blades 54 do not overlap the blades 66 and the central ring 62 of the second blade assembly 26. That is, when in the first position, the blades 54 of the first blade assembly 18 fit behind, or beneath, the blades 66 of the second blade assembly 26 so that the blades 54 appear to be stacked directly below the blades 66. In such an embodiment, only the blades 66 of the second blade assembly 26 would cut a food item when the dial 22 is in the first position. When the dial 22 is in the second position, the blades 54 of the first blade assembly 18 would begin cutting a food item after the blades 66 of the second blade assembly 26 finish cutting the food item.

In some embodiments, the first and second blade assemblies 18, 26 may include unequal numbers of blades 54, 66. For example, the first blade assembly 18 may include four blades 54 and the second blade assembly 26 may include eight blades 66. In such embodiments, when the dial 22 is in the first position, the cutting apparatus 10 will slice a food item into eight wedges of approximately the same size. However, when the dial 22 is in the second position, the cutting apparatus 10 will only cut a food item into twelve wedges of alternating sizes (e.g., six relatively larger wedges and six relatively smaller wedges).

As shown in FIGS. 3 and 4, the cutting apparatus 10 includes a locking mechanism 74 to releasably secure the dial 22 in the first and the second positions. The illustrated locking mechanism 74 includes four tabs 78 coupled to the dial 22 and four corresponding slots 82 formed in the body 14. In some embodiments, the tabs 78 may be coupled to the body 14 and the slots 82 may be formed in the dial 22, and/or the locking mechanism 74 may include fewer or more tabs and slots than the number illustrated. Each tab 78 is generally L-shaped and includes a lip 83 that rides within the corresponding slot 82 to inhibit the dial 22 from separating from, and thereby falling off of, the body 14. In the illustrated embodiment, the tabs 78 are formed as a single piece with the dial 22. In other embodiments, the tabs 78 may be separate components coupled to the dial 22.

Each slot 82 includes a first detent 86 and a second detent 90 corresponding to the first and second dial positions, respectively. In the illustrated embodiment, each detent 86, 90 is defined by a rib 91 extending partially through a central portion of the slot 82 and a ridge 92, 93 positioned on each side of the rib 91 and extending outwardly from the slot 82. Each detent 86, 90 is sized and shaped to receive a tab lip 83. The lips 83 of the tabs 78 thus fit within the space formed by the detents 86, 90 above the ridges 92, 93 to secure the dial 22 in each of the first and second positions. The ridges 92, 93 inhibit the lips 83 from easily or unintentionally moving into and out of the detents 86, 90. When a user pushes or pulls the dial 22 toward or away from the body 14, the tabs 78 deflect slightly outwardly or away from the axis 38 so that the lips 83 ride over the ridges 92, 93 and into or out of the detents 86, 90. In some embodiments, the detents 86, 90 may be indentations formed in each slot 82 to receive and hold the lips 83 of the tabs 78 in the first and second positions. In other embodiments, each slot 82 may include more detents than the two illustrated to releasably secure the dial 22 in more than two positions relative to the body 14.

When in the first position (FIG. 1), each tab 78 engages the corresponding first detent 86 of each slot 82 to secure the dial 22 in the first position. To rotate the dial 22 to the second position, a user pulls the dial 22 along the axis 38 away from the body 14, pulling the tabs 78 over the ridges 92 and out of the first detents 86. Next, as shown in FIG. 3, the user rotates the dial 22 about the axis 38 with the tab lips riding 83 in the space formed by the slots 82 beneath the rib 91 until each tab 78 is aligned with the corresponding second detent 90 in the space below the ridge 93. The user then pushes the dial 22 along the axis 38 toward the body 14 so that the tabs 78 ride over the ridges 93 with the lips 83 fitting within the second detents 90, securing the dial 22 in the second position (FIG. 2).

To rotate the dial 22 back to the first position, the above-described operation is performed in reverse. First, the user pulls the dial 22 along the axis 38 away from the body 14 to pull the tabs 78 over the ridges 93 and out of the second detents 90. The user rotates the dial 22 about the axis 38 in an opposite direction until the tabs 78 are aligned with the corresponding first detents 86 in the space below the ridge 92. The user then pushes the dial 22 along the axis 38 toward the body 14 such that the tabs 78 ride over the ridges 92 with the lips 93 fitting within the first detents 86 to secure the dial 22 back in the first position.

In some embodiments, the locking mechanism 74 may include, for example, one or more cam surfaces formed on the body 14 and the dial 22 to releasably secure the dial 22 in the first and second positions. In other embodiments, the locking mechanism 74 may include clips or set screws to releasably secure the dial 22 in each position. In still further embodiments, the dial 22 may be spring-biased to the first and second positions with an over-center latch configuration and/or the locking mechanism 74 may include an actuator to move the dial 22 to the first and second positions.

As shown in FIG. 1, the cutting apparatus 10 also includes a cover 94 configured to enclose a portion of the body 14 and the dial 22. The cover 94 helps cover and protect the first and second blade assemblies 18, 26 when the cutting apparatus 10 is not in use. The illustrated cover 94 includes four slots 98 to fit around the tabs 78 formed on the dial 22. In addition, the cover 94 includes a central projection 102 configured to fit within the central rings 50, 62 and sixteen ribs 106 configured to fit between the blades 54, 66 when the dial 22 is in either the first position or the second position. Such a construction inhibits shifting (e.g., rotating) of the cover 94 relative to the blade assemblies 18, 26 when the cover 94 is coupled to the body 14 and the dial 22.

The illustrated cover 94 is composed of a relatively soft polymeric material. In other embodiments, the cover 94 may be composed of a rigid material or may be composed of the same material as the body 14 and the dial 22. After a user slices a food item, the user may place or press the cutting apparatus 10 onto the cover 94 and push down on the cutting apparatus to free any wedges or the core of the food item that may become jammed between adjacent blades 54, 66 and the central rings 50, 62, respectively. In some embodiments, the cover 94 may also function as a cutting board such that a user may position a food item on the cover 94 before cutting and coring the food item with the cutting apparatus 10.

Figure 7:
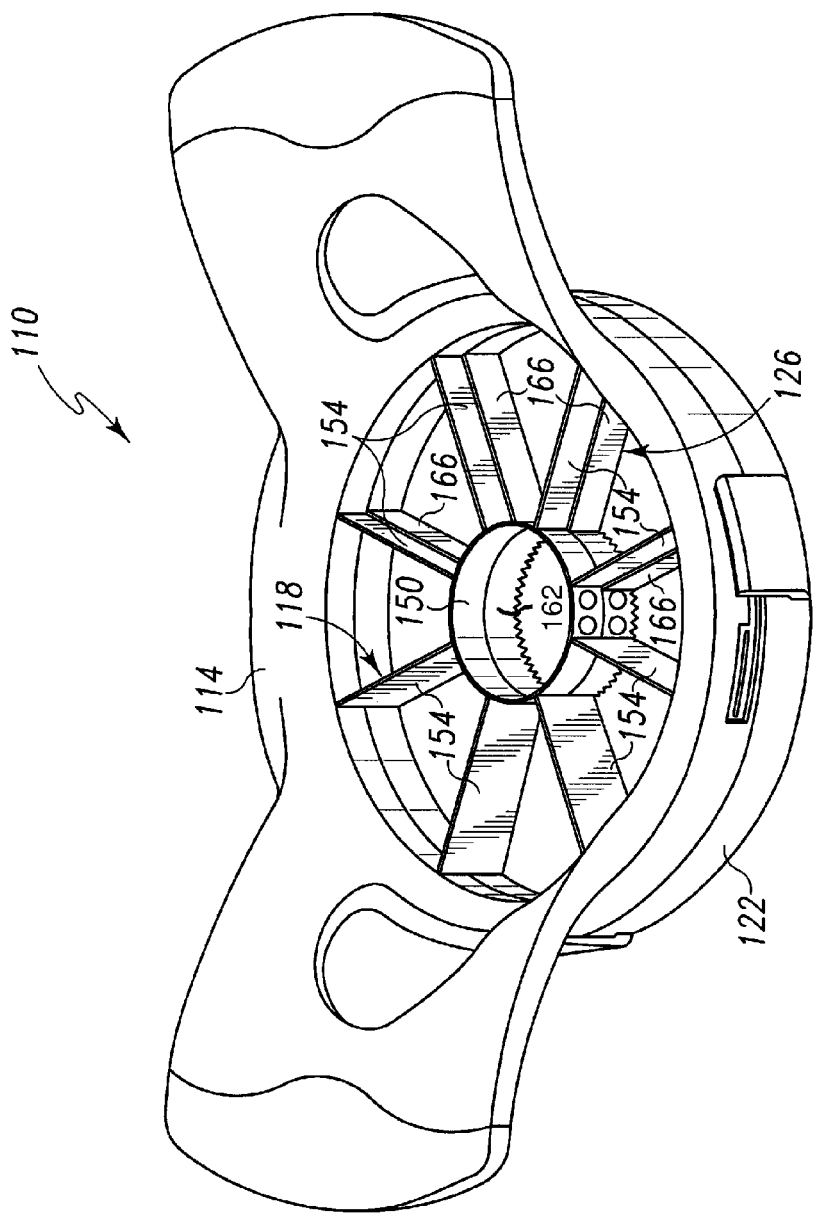
FIG. 7 is a top perspective view of another embodiment of the cutting apparatus.

FIG. 7 illustrates a cutting apparatus 110 according to another embodiment of the invention. The illustrated cutting apparatus 110 is similar to the cutting apparatus 10 discussed above with reference to FIGS. 1-6 and like parts have been given the same reference numbers plus 100.

The cutting apparatus 110 includes a body 114 supporting a first blade assembly 118 and a dial 122 supporting a second blade assembly 126. Similar to the cutting apparatus 110 discussed above, each blade assembly 118, 126 of the illustrated cutting apparatus 110 includes a plurality of blades 154, 166 and a central ring 150, 162. In the illustrated embodiment, the heights of the blades 154 of the first blade assembly 118 are not tapered. Rather, the blades 154 are at substantially the same height as the blades 166 of the second blade assembly 126 across substantially the entire length of the blades 154, 166. In such an embodiment, the entire cutting edge of each blade 154 of the first blade assembly 118 begins cutting a food item at substantially the same time as each blade 166 of the second blade assembly 126.

The illustrated cutting apparatuses 10, 110 allow a user to quickly change between slicing food items (e.g., apples) into eight or sixteen wedges without requiring two separate cutting tools. In addition, the cutting apparatuses 10, 110 include relatively few moving parts such that wear resulting from changing between the two cutting positions is minimized.

Various features and advantages of the invention are set forth in the following claims.

What is claimed is:

1. An apparatus for cutting a food item, the apparatus comprising:
   a body defining a first opening and supporting a first blade extending within the first opening, the first blade non-removably fixed to the body and having a side surface, and a cutting edge that extends along an end of the side surface and is configured to cut the food item; and
   a dial directly connected to the body, rotatable about an axis, and having a fixed size, the dial supporting a second blade having a side surface, and a cutting edge that extends along an end of the side surface and is configured to cut the food item;
   wherein the dial is rotatable relative to the body between a first position, where the side surface of the second blade is directly adjacent to the side surface of the first blade, and a second position, where the side surface of the second blade is offset from the side surface of the first blade wherein the body includes a handle positioned and configured such that a user grasps and applies a force to the handle in a direction generally parallel to the axis to move the first and second blades through the food item for cutting.

2. The apparatus of claim 1 wherein the first and second blades are configured to cut the food item into a first number of pieces when the dial is in the first position and a second number of pieces when the dial is in the second position, the first number of pieces being different than the second number of pieces.

3. The apparatus of claim 2, wherein the first number of pieces is eight and the second number of pieces is sixteen.

4. The apparatus of claim 1 further comprising a locking mechanism to releasably secure the dial in at least one of the first position and the second position.

5. The apparatus of claim 4, wherein the locking mechanism includes a tab and a detent, and wherein the tab engages the detent to releasably secure the dial in at least one of the first and second positions.

6. The apparatus of claim 5, wherein the locking mechanism includes a second detent, and wherein the tab engages the first-mentioned detent to releasably secure the dial in the first position and engages the second detent to releasably secure the dial in the second position.

7. The apparatus of claim 1, wherein the body supports a first plurality of blades and a first central ring, the first plurality of blades radially extending from the first central ring to the body, and wherein the dial supports a second plurality of blades and a second central ring, the second plurality of blades radially extending from the second central ring to the dial.

8. The apparatus of claim 7, wherein the second central ring includes a serrated cutting edge.

9. The apparatus of claim 1, wherein the first blade and the second blade have cutting edges in substantially the same horizontal plane.

10. The apparatus of claim 1, further comprising a cover removably coupled to at least one of the dial and the body, wherein the cover facilitates removal of the food item from the first opening.

11. The apparatus of claim 1, wherein when in the first position, the side surface of the second blade abuts the side surface of the first blade.

12. An apparatus for cutting a food item, the apparatus comprising:
a body having a handle;
a first plurality of blades non-removably fixed to the body and arranged about a central axis; and
a second plurality of blades supported by a dial that is directly connected to the body, the second plurality of blades being rotatable relative to the first plurality of blades between a first position to cut the food item into a first number of pieces and a second position to cut the food item into a second number of pieces, the second number of pieces being greater than the first number of pieces;
wherein the second plurality of blades maintains a constant radial position in a direction toward or away from the central axis while rotating relative to the first plurality of blades; and
wherein the handle is positioned and configured such that a user grasps and applies a force to the handle in a direction generally parallel to the central axis to move the first and second plurality of blades through the food item for cutting.

13. The apparatus of claim 12, wherein the first plurality of blades and the second plurality of blades include substantially the same number of blades.

14. The apparatus of claim 12, wherein each of the first plurality of cutting blades includes a side surface and a cutting edge that extends along an end of the side surface, wherein each of the second plurality of cutting blades includes a side surface and a cutting edge that extends along an end of the side surface, and wherein, when in the first position, the side surface of each of the second plurality of blades is directly adjacent to the side surface of a respective one of the first plurality of blades and, when in the second position, the side surface of each of the second plurality of blades is offset from the side surface of the respective one of the first plurality of blades.

15. The apparatus of claim 12, wherein the first number of pieces is eight and the second number of pieces is sixteen.

16. The apparatus of claim 12, wherein the handle is a first handle and further comprising a second handle spaced apart from the first handle on the body.

17. The apparatus of claim 12, further comprising a locking mechanism to releasably secure the second plurality of blades in at least one of the first position and the second position.

18. The apparatus of claim 17, wherein the locking mechanism includes a tab and a detent, and wherein the tab engages the detent to releasably secure the second plurality of blades in at least one of the first and second positions.

19. The apparatus of claim 18, wherein the locking mechanism includes a second detent, and wherein the tab engages the first-mentioned detent to releasably secure the second plurality of blades in the first position and engages the second detent to releasably secure the second plurality of blades in the second position.

20. The apparatus of claim 12, wherein at least one of the blades in the first plurality of blades and at least one of the blades in the second plurality of blades have cutting edges in substantially the same horizontal plane.

* * * * *